US008230498B2

(12) United States Patent
Shaffer et al.

(10) Patent No.: US 8,230,498 B2
(45) Date of Patent: Jul. 24, 2012

(54) SYSTEM AND METHOD FOR DEFENDING AGAINST DENIAL OF SERVICE ATTACKS ON VIRTUAL TALK GROUPS

(75) Inventors: Shmuel Shaffer, Palo Alto, CA (US); Amit Barave, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 1101 days.

(21) Appl. No.: 12/122,834

(22) Filed: May 19, 2008

(65) Prior Publication Data

US 2009/0288162 A1 Nov. 19, 2009

(51) Int. Cl.
*G06F 11/00* (2006.01)

(52) U.S. Cl. ........... 726/22; 726/23; 726/24; 726/25; 726/15; 709/238; 709/239; 715/734; 715/736

(58) Field of Classification Search .......... 726/13–15, 726/22–25
See application file for complete search history.

(56) References Cited

U.S. PATENT DOCUMENTS

| | | | | |
|---|---|---|---|---|
| 2004/0254977 A1* | 12/2004 | Zhang | | 709/201 |
| 2005/0097386 A1* | 5/2005 | Datta et al. | | 714/4 |
| 2005/0204162 A1* | 9/2005 | Rayes et al. | | 713/201 |
| 2006/0182034 A1* | 8/2006 | Klinker et al. | | 370/238 |
| 2006/0235932 A1* | 10/2006 | Celi et al. | | 709/207 |
| 2007/0107053 A1* | 5/2007 | Shraim et al. | | 726/22 |
| 2009/0232114 A1 | 9/2009 | Barave et al. | | |
| 2011/0225238 A1* | 9/2011 | Shaffer et al. | | 709/204 |

OTHER PUBLICATIONS

Peter Mell, Donald Marks, Mark McLarnon, A denial-of-service resistant intrusion detection architecture, Computer Networks vol. 34, Issue 4, Oct. 2000, pp. 641-658.*

* cited by examiner

*Primary Examiner* — Thanhnga B Truong
*Assistant Examiner* — Amir Mehrmanesh
(74) *Attorney, Agent, or Firm* — P. Su (57) ABSTRACT

In one embodiment, a method includes establishing a first virtual talk group (VTG) that includes a plurality of endpoints and has a first multicast address. The plurality of endpoints includes a first endpoint and a second endpoint. The method also includes monitoring traffic associated with the first VTG, determining when a denial of service (DOS) attack is indicated by the traffic, and identifying at least one rogue endpoint responsible for the DOS attack when it is determined that the DOS attack is indicated. The first endpoint and the second endpoint are notified that they are to participate in a dynamic switchover to a second VTG when a DOS attack is indicated. The second VTG is established using a second multicast address, and includes the first endpoint and the second endpoint, but not the rogue endpoint.

17 Claims, 11 Drawing Sheets

SYSTEM AND METHOD FOR DEFENDING AGAINST DENIAL OF SERVICE ATTACKS ON VIRTUAL TALK GROUPS

CROSS REFERENCE TO RELATED APPLICATIONS

The present invention is related to co-pending U.S. patent application Ser. Nos. 12/049,108 (filed Mar. 14, 2008), entitled "Priority-Based Multimedia Stream Transmissions," which is incorporated herein by reference in its entirety.

BACKGROUND OF THE INVENTION

The present invention relates generally to interoperability systems.

Communications interoperability systems allow disparate systems to be substantially connected, as for example such that two-way radios or push-to-talk (PTT) radios associated with different systems may communicate with each other. Some communications interoperability systems are configured to effectively leverage multicast networks in order to support the routing of media streams between endpoints which are participants in virtual talk groups (VTGs). Typically, such media streams are routed using multicast routing schemes, although media streams may be routed using unicast routing schemes in the absence of the availability of multicast routing.

A VTG generally carries a mix of multicast and unicast traffic, and may be associated with a unique multicast address. Alternatively, a single, overall VTG may include multiple participating talk groups that are supported by unique multicast addresses. When there are multiple unique multicast addresses associated with talk groups, media may be streamed, restreamed, switched, and bridged between the multiple multicast addresses.

VTGs may sometimes be compromised by intentional or unintentional rogue behavior. By way of example, a rogue endpoint may exhibit rogue behavior by launching a denial of service (DOS) attack on a VTG multicast group and, therefore, prevent legitimate endpoints from being able to send and receive traffic within the VTG multicast group. A rogue endpoint may launch a DOS attack on the VTG multicast group by sending a relatively large number of data and/or media streams on the VTG multicast group. Such a DOS attack may effectively render it impossible for media to be comprehended by receiving endpoints or streamed, restreamed, switched, and bridged between multiple multicast addresses associated with the VTG multicast group.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

According to one aspect of the present invention, a method includes establishing a first virtual talk group (VTG) that includes a plurality of endpoints and has a first multicast address. The plurality of endpoints includes a first endpoint and a second endpoint. The method also includes monitoring traffic associated with the first VTG, determining when a denial of service (DOS) attack is indicated by the traffic, and identifying at least one rogue endpoint responsible for the DOS attack when it is determined that the DOS attack is indicated. The first endpoint and the second endpoint are notified that they are to participate in a dynamic switchover to a second VTG when a DOS attack is indicated. The second VTG is established using a second multicast address, and includes the first endpoint and the second endpoint, but not the rogue endpoint.

Description

Virtual talk groups (VTGs) associated with communications interoperability systems may be compromised by rogue behavior. When one of the endpoints participating in a VTG is a rogue or otherwise illegitimate endpoint, the rogue endpoint may launch a denial of service (DOS) attack with respect to the VTG. As a result, legitimate endpoints may be prevented from communicating through the VTG. Legitimate endpoints adhere to the rules of monitoring a multicast address, checking to determine if there are other media streams present on the multicast address, and refrain from transmitting media if there are already existing media streams associated with the multicast address. Legitimate endpoints may also limit the length of their media streams, and may back off, e.g., stop transmitting, in the event that the legitimate endpoints detect media streams with higher priorities being transmitted over the VTG.

A DOS attack may involve the rogue endpoint sending a relatively large number of data and/or media streams with respect to the VTG. When the rogue endpoint essentially utilizes a significant amount of the bandwidth associated with the VTG, legitimate or authenticated endpoints participating in the VTG may be prevented from being able to send and receive traffic within the VTG.

When a DOS attack launched by a rogue endpoint on a VTG is identified by a communications interoperability system, the communications interoperability system may allow legitimate endpoints associated with the VTG to continue communicating, while substantially preventing the rogue endpoint from continuing to disrupt the communications between the legitimate endpoints. That is, the communications interoperability system defends against rogue endpoints and DOS attacks perpetuated by the rogue endpoints.

In one embodiment, the communications interoperability system may allow legitimate endpoints associated with a first VTG to join a new VTG when a rogue endpoint is detected in the first VTG or when a DOS attack is identified with respect to the first VTG. It should be appreciated that the detection of a rogue endpoint is typically associated with the identification of a DOS attack, and vice versa. To defend against rogue endpoints and DOS attacks, a communications interoperability system may monitor traffic associated with a VTG, and provide for a dynamic address switchover of legitimate endpoints to a VTG associated with a new address if the traffic indicates that a DOS attack is being perpetuated by a rogue endpoint.

Endpoints associated with a first VTG which uses a first multicast address are generally informed by a communications interoperability system when a DOS attack is identified with respect to the first VTG, and notified that they are to join a new VTG which uses a new multicast address. Endpoints which may participate in a VTG typically include, but are not limited to including, a push-to-talk (PTT) media center (PMC), internet protocol (IP) phones which utilize multicast routing, IP phones which utilize IP telephony gateways, public switched telephone network (PSTN) phones which utilize IP telephony gateways, and radios.

One communications interoperability system which may be configured to defend against DOS attacks is the Cisco IP Interoperability and Collaboration System (IPICS) available from Cisco Systems, Inc. of San Jose, Calif. IPICS is an IP network interoperability and collaboration platform that allows voice, video, and data networks to be substantially integrated. IPICS is a scalable, comprehensive system which supports communications interoperability and distributed incident management. IPICS allows radio traffic to be sent over an IP network, and enables substantially direct communication among various devices including, but not limited to including, PTT devices, radios, IP phones, mobile phones, PSTN phones, and computing devices. While IPICS is a suitable system which defends against DOS attacks by establishing new VTGs, it should be appreciated that IPICS is just one example of a suitable communications interoperability which may defend against DOS attacks.

Figure 1A:
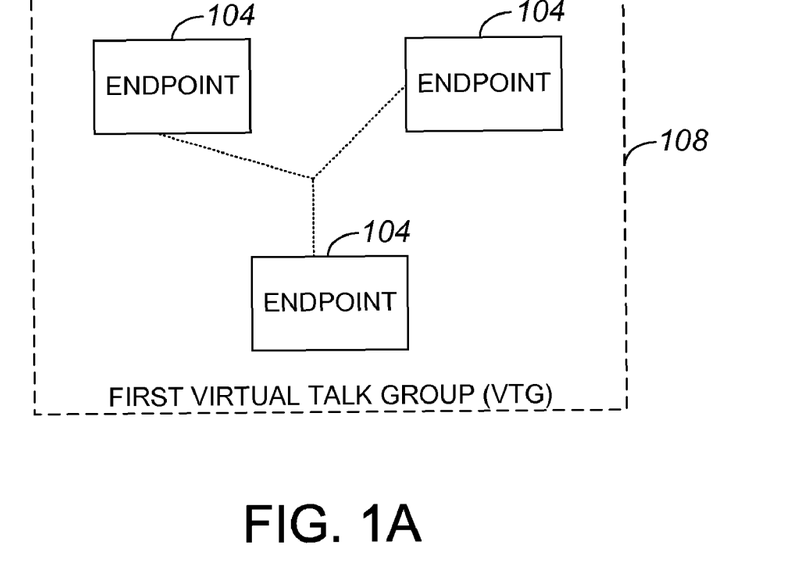
FIG. 1A is a diagrammatic representation of a plurality of endpoints participating in a first virtual talk group (VTG) at a time t1.
Figure 1B:
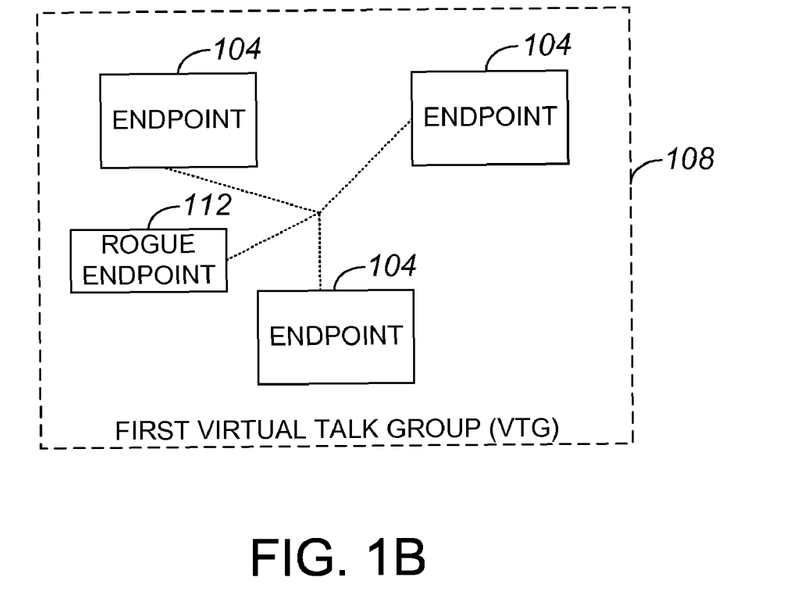
FIG. 1B is a diagrammatic representation of a rogue endpoint effectively participating in and disrupting communications within a first VTG, e.g., VTG 108 of FIG. 1A.
Figure 1C:
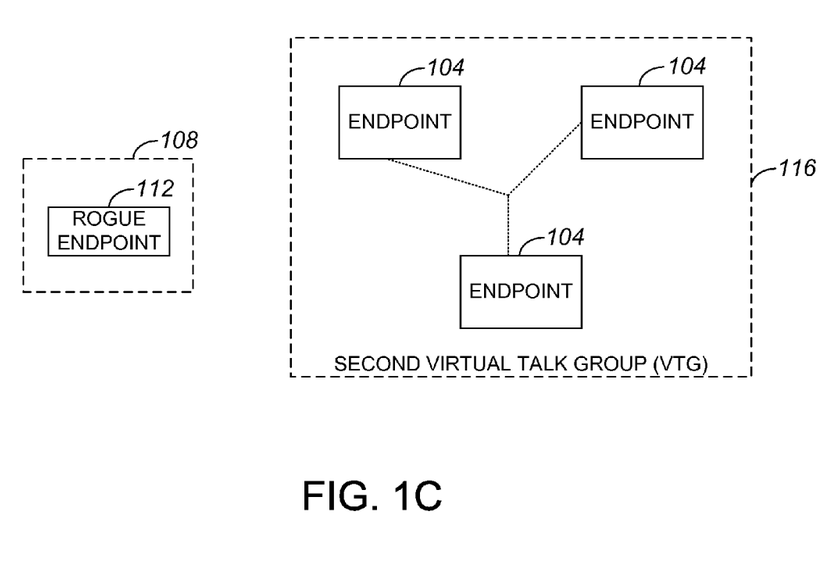
FIG. 1C is a diagrammatic representation of a plurality of endpoints, e.g., plurality of endpoints 104 of FIGS. 1A and 1B, forming a second VTG that does not include the rogue endpoint at a time t3 in accordance with an embodiment of the present invention.

Referring initially to FIGS. 1A-1C, the operation of a system in which a DOS is defended against by the creation of a new VTG will be described in accordance with an embodiment of the present invention. FIG. 1A is a diagrammatic representation of a plurality of endpoints participating in a first VTG at a time t1. At a time t1, endpoints 104 which have joined a first VTG 108 send data and/or media streams to each other and receive media streams from each other. That is, at time t1, traffic is exchanged, e.g., as multicast streams, between endpoints 104 that are a part of first VTG 108. It should be appreciated that endpoints 104 are legitimate endpoints, or endpoints that are substantially known to be trusted by an overall IPICS media service node (not shown), or any other component (not shown) of an overall network, that monitors traffic exchanged between endpoints 104.

At a time t2, as indicated in FIG. 1B, an illegitimate or rogue endpoint 112 effectively joins first VTG 108 and joins in the exchange of traffic within first VTG 108. It should be appreciated that while rogue endpoint 112 is described as being new to first VTG 108, one of endpoints 104 may instead become rogue, i.e., a rogue endpoint is not limited to being new to first VTG 108. In the described embodiment, rogue endpoint 112 launches a DOS attack on first VTG 108 by sending a relatively large number of data and/or media streams within first VTG 108. Such a DOS attack may essentially cause a loss of an ability to comprehend communications over first VTG 108. With respect to endpoints 104, a DOS attack perpetuated by rogue endpoint 112 may cause an inability for endpoints 104 to send and to receive traffic, or substantially to comprehend communications over first VTG 108.

When a DOS attack is detected, and the cause of the DOS attack, namely rogue endpoint 112, is identified, an IPICS media service node (not shown) may effectively automatically arranged for a new VTG to be established and joined by endpoints 104 such that endpoints 104 may continue to send and to receive traffic. FIG. 1C is a diagrammatic representation of endpoints 104 at a time t3 at which a second VTG is created for endpoints 104 in accordance with an embodiment of the present invention. Upon detecting rogue endpoint 112 as an unwanted participant in first VTG 108, a second VTG 116 is created. Endpoints 104 are provided with information, as for example a new multicast address, that allows endpoints 104 to join second VTG 116. Rogue endpoint 112, however, is not provided with information pertaining to second VTG 116 and, hence, does not join second VTG 116.

Once endpoints 104 join second VTG 116, endpoints 104 send and receive traffic associated with second VTG 116. That is, endpoints 104 are allowed to continue exchanging data and/or media streams without disruptions caused by rogue endpoint 112. In one embodiment, and IPICS server (not shown) may stream media from second VTG 116 to first VTG 108, but not from first VTG 108 to second VTG 116. As such, the ability for endpoint 112 may listen to communications amongst endpoints 104 substantially without disturbing communications amongst endpoints 104.

Figure 2:
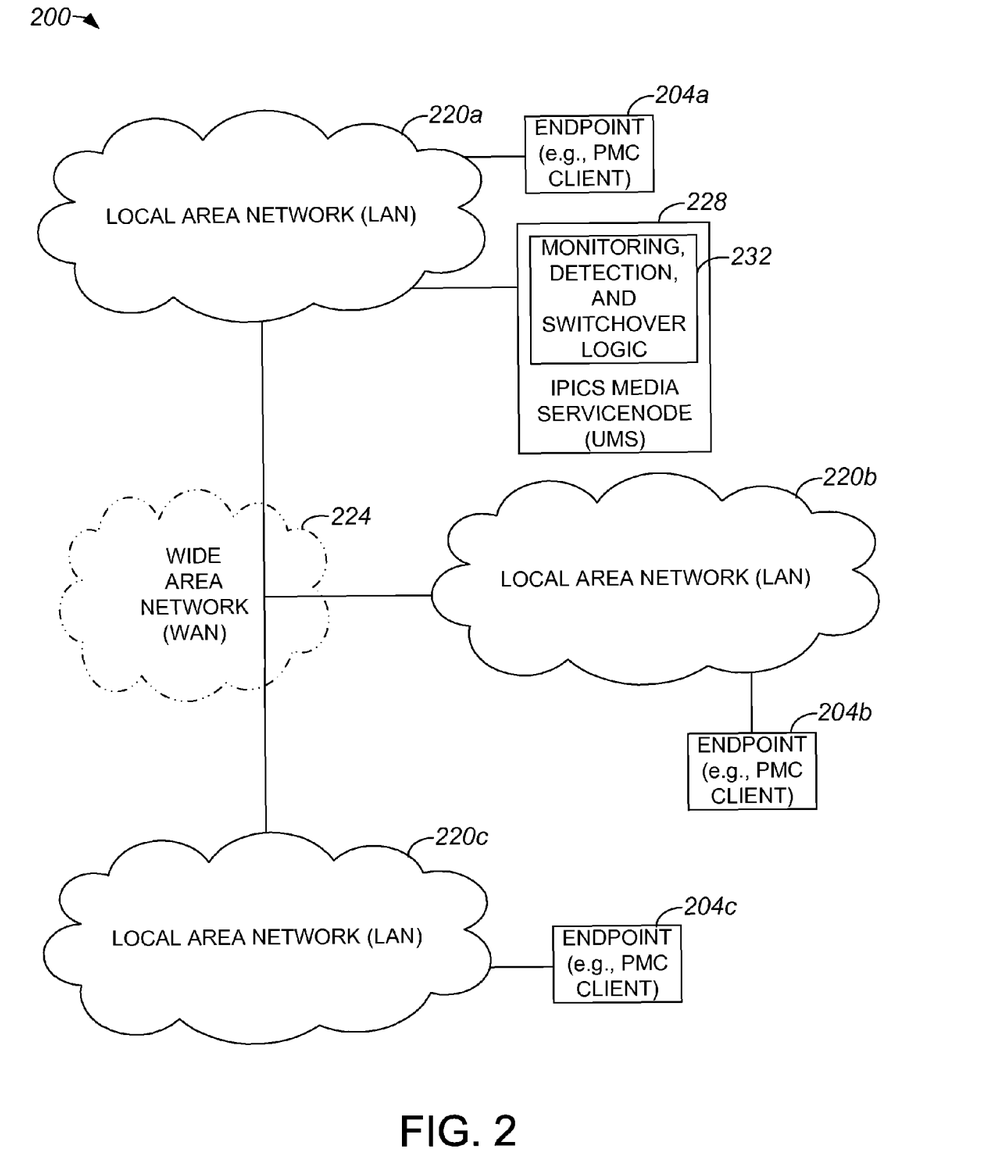
FIG. 2 is a diagrammatic representation of an overall network in which denial of service (DOS) attacks may be defended against in accordance with an embodiment of the present invention.

In general, a VTG may be distributed throughout a network such that endpoints associated with the VTG are associated with different local area networks (LANs). With reference to FIG. 2, an overall network in which DOS attacks on VTGs may be defended against will be described in accordance with an embodiment of the present invention. An overall network 200 includes multiple LANs 220a-220c which are in communication over a wide area network (WAN) 224. Although three LANs 220a-220c are shown for purposes of illustration, it should be appreciated that the number of LANs 220a-220c may vary widely.

Each LAN 220a-220c may be associated with an endpoint 204a-204c, respectively. Endpoints 204a-204c may include, but are not limited to including, push-to-talk management centers (PMCs) which are arranged to manage communications associated with PTT devices, internet protocol (IP) phones which utilize multicast routing, IP phones which utilize IP telephony gateways, public switched telephone network (PSTN) phones which utilize IP telephony gateways, and land mobile radio gateways. PMCs may be controlled by an IPICS server, and may adhere to the behavioral characteristics including, but not limited to including, yielding the floor to high priority media streams, refraining from transmitting mediate into a VTG which has multiple active media streams of the same or a higher priority, real-time control protocol (RTCP) support, and active stream selection.

Using endpoints 204a-204c, individuals (not shown) who operate PTT devices may be able to communicate with each other over a VTG that has been joined by endpoints 204a-204c. That is, through endpoints 204a-204c, PTT devices (not shown) may communicate.

An IPICS media service node 228 is a component which facilitates the participation of endpoints 204a-204c in a VTG. IPICS media service node 228 may serve as universal media service (UMS) component, or otherwise include UMS functionality, which allows media streams associated with a VTG to be switched, streamed, restreamed, and/or bridged. A UMS may be arranged to, but is not limited to being arranged to, restream multicast media streams between different multicast addresses, restream media streams between unicast and multicast addresses, transcode media as part of a restreaming process, monitor the number of media streams and their respective priorities in a given VTG, monitor media streams for adherence to an overall streaming policy. As will be appreciated by those skilled in the art, streaming policies of a system may include, but are not limited to including, refraining from transmitting into a VTG which has more than a certain number of active media streams, e.g., approximately three or more, of the same priority as a sending or transmitting endpoint, refraining from transmitting into a VTG which has more than a particular number of active media streams, e.g., approximately one or more, that have a higher priority than the sending endpoint, and ceasing the transmission of media streams into a VTG if a media stream of a higher priority is detected in the VTG.

IPICS media service node 228 includes monitoring, detection, and switchover logic 232. Monitoring, detection, and switchover logic 232 monitors traffic sent within a VTG that includes endpoints 204a-204c, detects whether there is a rogue endpoint (not shown) included in the VTG, and causes a switchover of endpoints 204a-204c to a new VTG if a rogue endpoint has been detected. One embodiment of IPICS media service node 228 will be discussed below with respect to FIG. 3.

As shown, UMS functionality may be provided by IPICS media service node 228, e.g., in an integrated unit substantially attached to a single LAN 220a. Alternatively, UMS functionality may be distributed such that at least portions of UMS functionality are associated with each LAN 220a-220c. In other words, in lieu of IPICS media service node 228, the functionality associated with IPICS media service node 228 may be provided in different components spread throughout overall network 200. In one embodiment, components which provide UMS functionality may be incorporated within endpoints 204.

Figure 3:
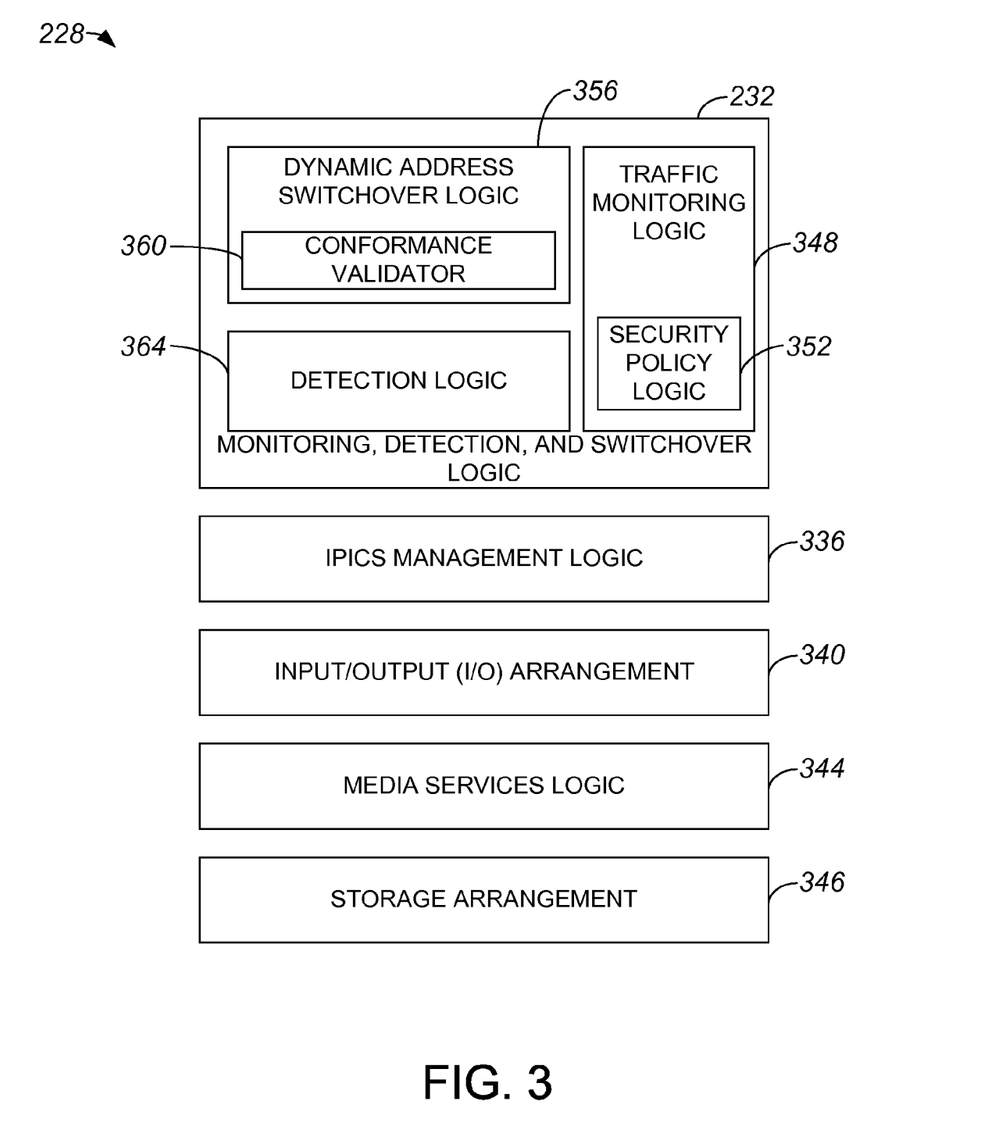
FIG. 3 is a block diagram representation of an Internet Protocol (IP) interoperability and collaboration system (IPICS) media service node, e.g., IPICS media service node 228 of FIG. 2, in accordance with an embodiment of the present invention.

FIG. 3 is a block diagram representation of an IPICS media service node, e.g., IPICS media service node 228 of FIG. 2, in accordance with an embodiment of the present invention. IPICS media service node 228 generally includes hardware and/or software logic. Software logic included in IPICS media service node 228 is typically embodied in a tangible media such as a computer-program product or a computer-readable medium.

IPICS media service node 228 includes an input/output (I/O) arrangement 340 that is generally configured to receive and to send traffic such as data streams and/or media streams. I/O arrangement 340 typically includes ports which enable IPICS media service node 228 to communicate with endpoints (not shown) in a network.

IPICS media service node 228 also includes a storage arrangement 346. Storage arrangement 346 may include memory which contain data structures, as for example tables, into which information relating to endpoints and VTGs effectively supported by IPICS media service node 228 may be stored. Tables which may be stored in storage arrangement 346 include, but are not limited to including, tables which store information associated with synchronization source identifiers (SSRCs) associated with endpoints (not shown) and tables which store information regarding potential rogue endpoints (not shown). Such information may be used by monitoring, detection, and switchover logic 228 to facilitate the detection of potential rogue endpoints (not shown) and other media service nodes (not shown) in a network.

IPICS management logic 336 and media services logic 344, e.g., UMS logic, are also included in IPICS media service node 228. IPICS management logic 336 is arranged to effectively allow disparate endpoints to communicate with one another. In one embodiment, IPICS management logic 336 enables an endpoint (not shown) associated with a PMC to be substantially integrated with endpoints (not shown) associated with other PMCs, voice networks, video networks, and data networks. Generally, IPICS may bridge radio, telephony, IP, and non-IP networks. In addition, IPICS management logic 336 may facilitate traffic associated with a radio network being sent over an IP network. Media services logic 344 may be arranged to issue an internet group management protocol (IGMP) that enables IPICS media service node 228 to effectively join a VTG and partake in related multicast communications. Media services logic 344 may also collect information relating to endpoints (not shown), and store such information, e.g., information regarding addresses of senders of media streams, in data structures stored in storage arrangement 346.

Monitoring, detection, and switchover logic 232 of IPICS media service node 228 includes traffic monitoring logic 348, detection logic 364, and dynamic address switchover logic 356. Traffic monitoring logic 348 monitors traffic within a VTG to determine the number of media streams in a given VTG and their relative priorities, the order in which the media streams were started and, based on the number of media streams and the order in which such mediated streams were started, infer the legitimacy of packets contained in the traffic. Security policy logic 352 may be included in traffic monitoring logic 348, and may be arranged to provide thresholds used in the determination of whether a DOS attack has been launched within a VTG. Such thresholds may include, but are not limited to including, a substantially maximum number of allowed streams which may be sent by a given endpoint, and a safety threshold which is a substantially maximum number of unique media streams which may be sustained by a VTG. Security policy logic 352 may also monitor the adherence of various endpoints (not shown) to an established back-off policy. By way of example, security policy logic 352 may be configured to verify that endpoints (not shown) yield the floor, or yield floor control, to higher priority media streams.

Detection logic 364 is configured to detect rogue behavior by endpoints (not shown) such as a DOS attack, and to identify the offending endpoint, or the endpoint which perpetrates the DOS attack. Detection logic 364 may utilize source identifiers of packets from storage arrangement 346 to identify an offending endpoint (not shown). Dynamic address switchover logic 356 is arranged to notify legitimate endpoints (not shown) of a new multicast address, e.g., a multicast address of a new VTG group, and to trigger a switchover of the legitimate endpoints from a VTG group that is under a DOS attack to the new VTG group. Dynamic address switchover logic 356 may provide a new multicast address associated with the new VTG group to each legitimate endpoint (not shown). It should be appreciated that dynamic address switchover logic 356 in collaboration with an IPICS server (not shown) may also identify the new multicast address. A conformance validator 360 of dynamic address switchover logic 356 is arranged to determine whether traffic is compliant with VTG participation policies and/or with a real time protocol (RTP) or with an RTCP priority policy. In other words, conformance validator 360 performs validation of packets.

Figure 4:
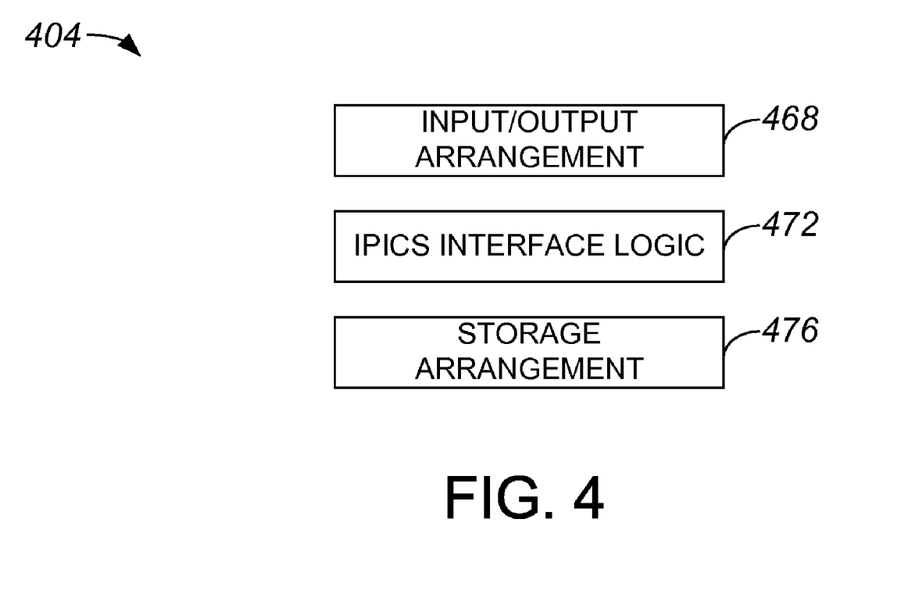
FIG. 4 is a block diagram representation of an endpoint which may leave one VTG and join another VTG as part of a defense against a DOS attack in accordance with an embodiment of the present invention.

FIG. 4 is a block diagram representation of an endpoint which may leave one VTG and join another VTG as part of a defense against a DOS attack in accordance with an embodiment of the present invention. An endpoint 404 may include an I/O arrangement 468, IPICS interface logic 472, and a storage arrangement 476. I/O arrangement 468 includes ports on which traffic may be sent and received, as well as transmission logic which allows traffic to be transmitted, e.g., to a client such as a PTT device and to an IPICS media service node. The transmission logic generally supports multicast and unicast. IPICS interface logic 472 allows endpoint 404 to communicate with an IPICS media service node and to participate in a VTG. IPICS interface logic 472 may also be configured to dynamically switchover to a new VTG when notified to do so. Storage arrangement 476 is arranged to store information such as a list of alternate multicast addresses which may be used to establish new VTGs.

Figure 5:
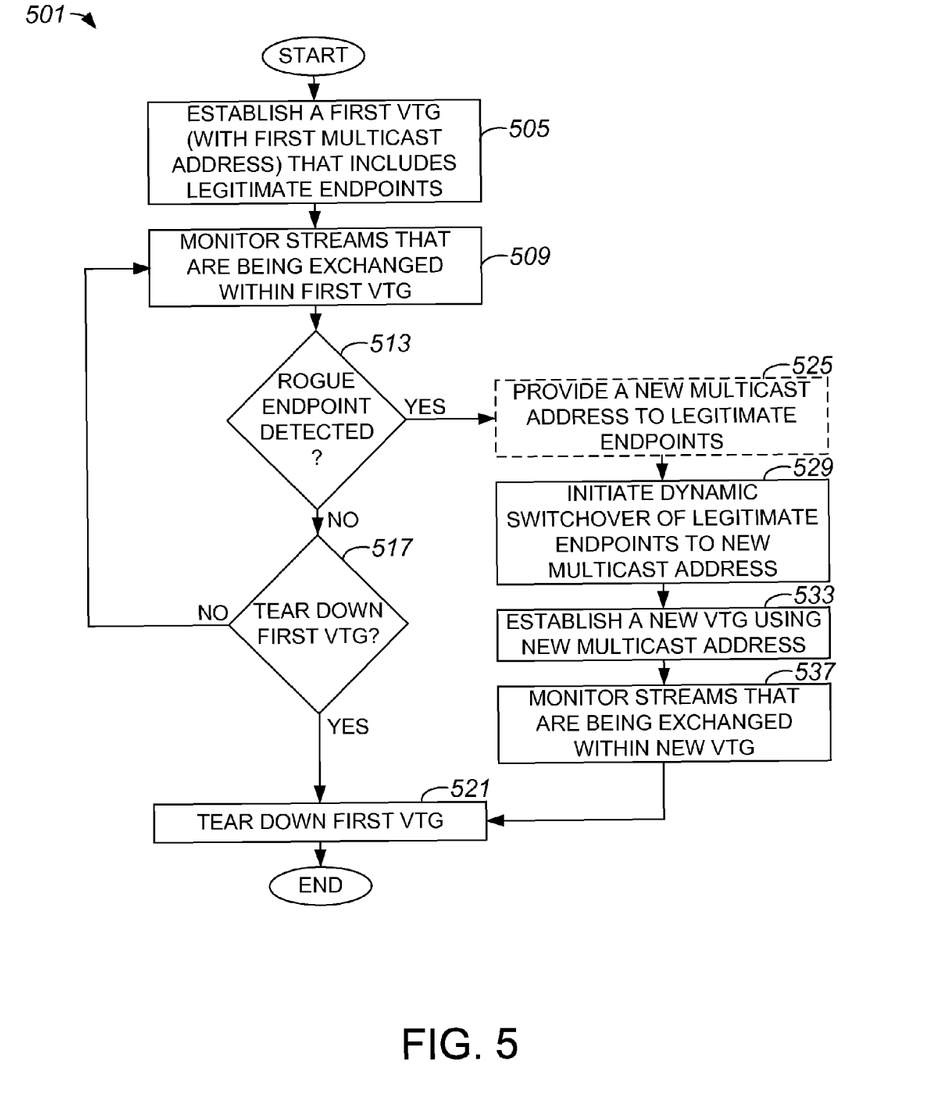
FIG. 5 is a process flow diagram which illustrates one general method of defending against a DOS attack on a first VTG in accordance with an embodiment of the present invention.

Referring next to FIG. 5, one general method of defending against a DOS attack mounted on a first VTG will be described from the point of view of an IPICS media services node in accordance with an embodiment of the present invention. A process 501 of defending against a DOS attack begins at step 505 in which a first VTG is established using a first multicast address. The first VTG is established amongst authenticated endpoints or amongst endpoints which are considered to be legitimate. Typically, the first VTG is established by an IPICS media service node.

Once the first VTG is established, data and/or media streams are exchanged within the first VTG while the IPICS media service node monitors the exchange of the media streams in step 509. In other words, the IPICS media service node monitors traffic exchanged within the first VTG.

A determination is made in step 513 as to whether a rogue endpoint is detected within the first VTG. The detection of a rogue endpoint typically involves determining whether a DOS attack has been detected, e.g., whether the system detects endpoints which do not comply with the policies of an overall network. One method of detecting a rogue endpoint will be discussed below with respect to FIG. 8.

If it is determined in step 513 that no rogue endpoint is detected, a determination is made in step 517 regarding whether the first VTG is to be torn down. Determining whether the first VTG is to be taken down may include determining whether there has been a request to tear down the first VTG, or determining whether there is no longer any traffic associated with the first VTG. If the determination is that the first VTG is not to be torn down, process flow returns to step 509 in which streams that are being exchanged within the first VTG are monitored. Alternatively, if it is determined that the first VTG is to be torn down, the first VTG is torn down or otherwise terminated in step 521, and the process of defending against a DOS attack is completed.

Returning to step 513, if the determination is that a rogue endpoint is detected, a new multicast address may be optionally provided, e.g., by an IPICS media service node, to the legitimate endpoints associated with the first VTG. It should be appreciated that in one embodiment, a list of alternative multicast addresses which may be used if a dynamic switchover is needed may be provided to the legitimate endpoints when the first VTG is established. In such an embodiment, a new multicast address may be obtained from the list of alternative multicast addresses, and a new multicast address need not be provided by the IPICS media service node.

In step 529, a dynamic switchover of legitimate endpoints to the new multicast address is initiated. Initiating or triggering a dynamic switchover of legitimate endpoints may include notifying the legitimate endpoints, but not the rogue endpoint, of the need to switchover to a new VTG. After the dynamic switchover is initiated, a new VTG is established in step 533 using the new multicast address. Once the new VTG is established, streams may be exchanged within the new VTG and the IPICS media service node may monitor the exchange of streams in step 537. Then, in step 521, the first VTG is torn down, and the process of defending against a DOS attack is completed.

Figure 6:
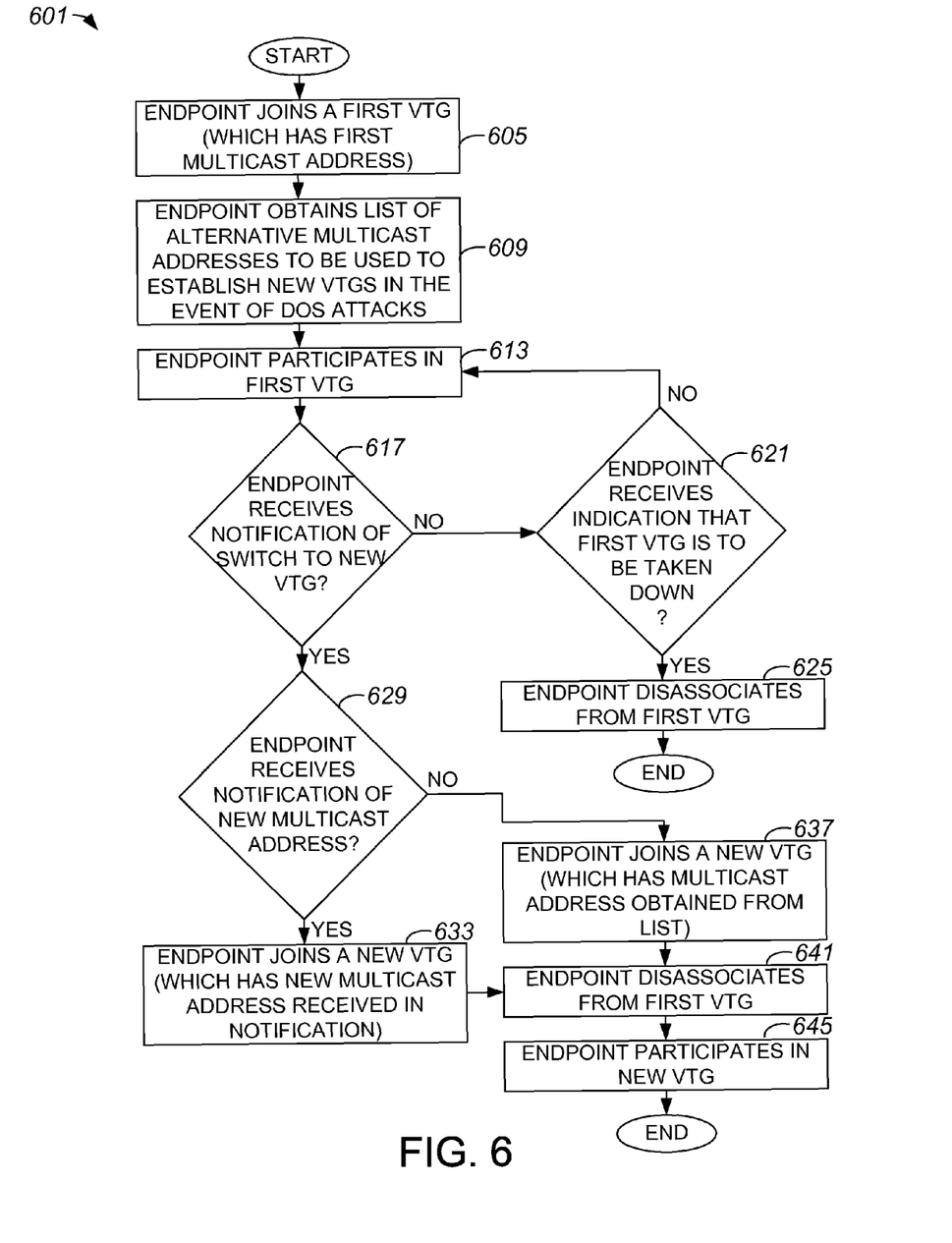
FIG. 6 is a process flow diagram which illustrates the operation of an endpoint which defends against a DOS attack in accordance with one embodiment of the present invention.

An IPICS media server may provide a list of alternative multicast addresses which may be used to establish a new VTG to endpoints which join an original VTG, as previously mentioned. FIG. 6 is a process flow diagram which illustrates the operation of an endpoint which defends against a DOS attack and is provided a list of alternative multicast addresses in accordance with one embodiment of the present invention. A process 601 of operating an endpoint begins in step 605 in which the endpoint joins a first VTG which has a first multicast address. The first VTG may be joined by the endpoint either when the first VTG is established, e.g., the first VTG may be established to include the endpoint, or after the first VTG has already been established, e.g., the endpoint may join a first VTG that was previously established to include other endpoints.

In step 609, the endpoint obtains a list of alternative multicast addresses which may be used to establish new VTGs in the event of DOS attacks. The endpoint may store the list in an associated storage arrangement. The list may include any number of alternative multicast addresses. Such alternative multicast addresses are typically relatively random, or are otherwise chosen such that a rogue endpoint would be unlikely to successfully guess what the alternative multicast addresses may be.

Once the endpoint obtains the list of alternative multicast addresses, the endpoint participates in the first VTG in step 613. It is then determined in step 617 whether the endpoint receives a notification of a need to switch to a new VTG. That is, it is determined whether a dynamic switchover is triggered. A notification of a need to switch to a new VTG may be received from an IPICS media service node if the IPICS media service node determines either that a rogue endpoint has joined the first VTG, or that a formerly legitimate endpoint in the first VTG has become rogue.

If it is determined in step 617 that the endpoint has received a notification of a switch to a new VTG, then in step 629, a determination is made as to whether the endpoint receives a notification of a new multicast address. It should be appreciated that although the endpoint has a list of alternative multicast addresses, the endpoint may still receive a new multicast address. For example, if a rogue endpoint that is detected within the first VTG was previously a legitimate endpoint, that rogue endpoint may have the list of alternative multicast addresses. Hence, to prevent such rogue endpoint from being able to join the new VTG, a new multicast address which is not listed in the list of alternative multicast addresses may be provided to substantially all legitimate endpoints associated with the first VTG.

If the determination in step 629 is that the endpoint has received a notification of a new multicast address, then the endpoint joins a new VTG in step 633 which is associated with the new multicast address. After the endpoint joins the new VTG, the endpoint effectively disassociates itself from the first VTG in step 641. The endpoint then participates in the new VTG in step 645, e.g., exchanges streams with other endpoints associated with the new VTG, and the process of operating an endpoint is completed.

Alternatively, if it is determined in step 629 that the endpoint has not received a notification of a new multicast address, then the endpoint joins a new VTG in step 637 which is associated with a multicast address obtained from the list of alternative multicast addresses. Then, process flow moves to step 641 in which the endpoint disassociates from the first VTG.

Returning to step 617 and the determination of whether the endpoint has received a notification of a switch to a new VTG, if it is determined that such a notification has not been received, the indication is that the endpoint may continue to participate in the first VTG unless the first VTG is to be torn down. As such, process flow moves from step 617 to step 621 in which it is determined whether the endpoint receives an indication that the first VTG is to be taken down.

If the determination is that the endpoint has not received an indication that the first VTG is to be torn down, then process flow returns to step 613 in which the endpoint participates in the first VTG. Alternatively, if it is determined that the endpoint has received an indication that the first VTG is to be torn down, then the endpoint disassociates from the first VTG in step 625, and the process of operating an endpoint is completed.

Figure 7:
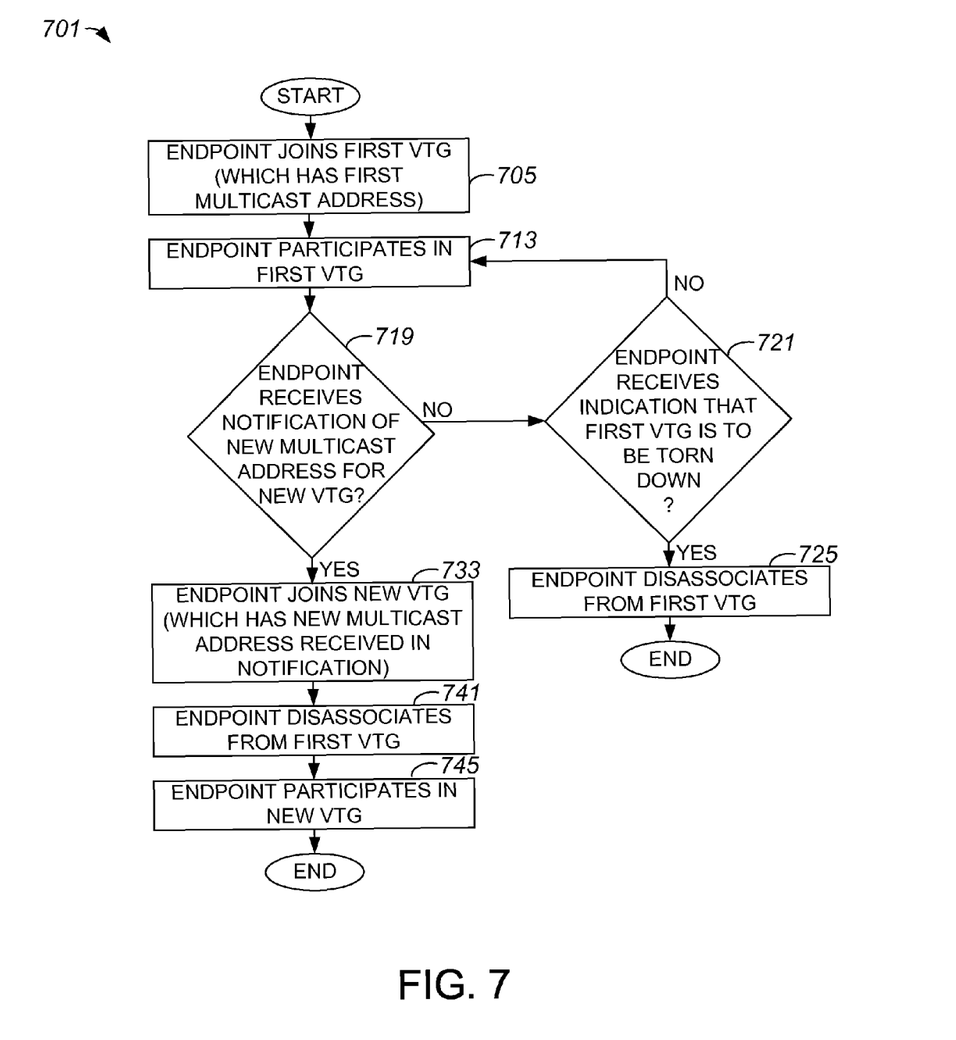
FIG. 7 is a process flow diagram which illustrates the operation of an endpoint which defends against a DOS attack in accordance with another embodiment of the present invention.

In lieu of being provided with a table of alternative multicast addresses, an endpoint may instead be notified of a new multicast address when a dynamic switchover is triggered. FIG. 7 is a process flow diagram which illustrates the operation of an endpoint which defends against a DOS attack and receives a new multicast address when a dynamic switchover is indicated in accordance with another embodiment of the present invention. A process 701 of operating an endpoint begins in step 705 in which the endpoint joins a first VTG which has a first multicast address. The first VTG may be joined by the endpoint either when the first VTG is established, or after the first VTG has already been established. The endpoint then participates in the first VTG in step 713.

In step 719, a determination is made as to whether the endpoint receives a notification of a new multicast address for a new VTG. If the determination in step 719 is that the endpoint has received a notification of a new multicast address for a new VTG, then the endpoint joins a new VTG in step 733 which is associated with the new multicast address. Once the endpoint joins the new VTG, the endpoint effectively disassociates itself from the first VTG in step 741. The endpoint then participates in the new VTG in step 745, and the process of operating an endpoint is completed.

Alternatively, if it is determined in step 719 that the endpoint has not received a notification of a new multicast address for a new VTG, then process flow moves to step 721 in which it is determined whether the endpoint receives an indication that the first VTG is to be torn down. If it is determined that the endpoint has not received an indication that the first VTG is to be torn down, then process flow returns to step 713 in which the endpoint continues to participate in the first VTG. On the other hand, if it is determined that the endpoint has received an indication that the first VTG is to be torn down, then in step 725, the endpoint disassociates from the first VTG. After the endpoint disassociates from the first VTG, the process of operating an endpoint is completed.

Figure 8:
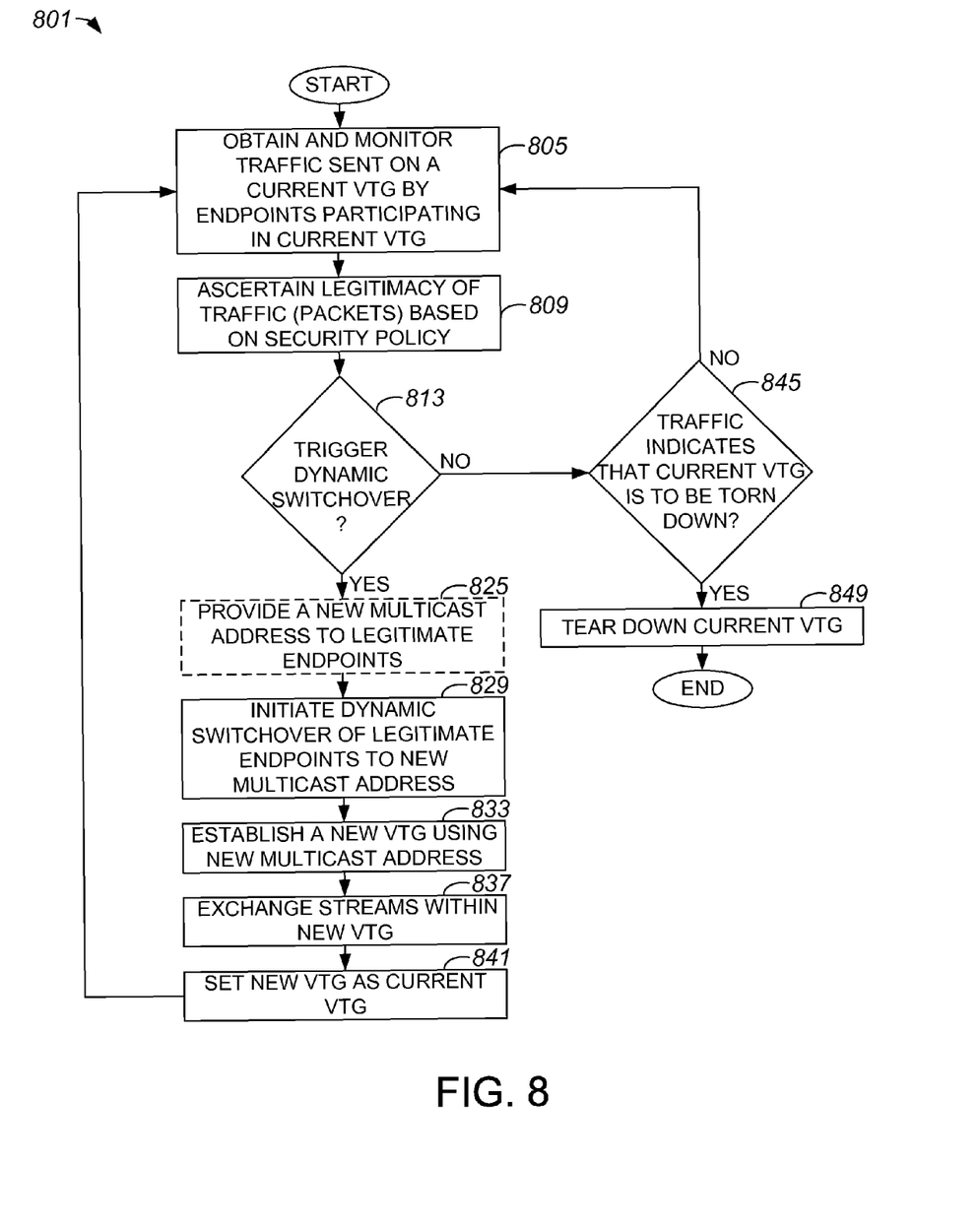
FIG. 8 is a process flow diagram which illustrates a method of identifying a rogue endpoint which is perpetuating a DOS attack in accordance with an embodiment of the present invention.

An IPICS media service node generally monitors a VTG to determine whether a DOS attack has been launched within the VTG. Detecting a DOS attack typically entails identifying a rogue endpoint, or a source of the DOS attack. FIG. 8 is a process flow diagram which illustrates a method of identifying a rogue endpoint which is perpetuating a DOS attack in accordance with an embodiment of the present invention. A process 801 of identifying a rogue endpoint begins at step 805 in which an IPICS media service node effectively obtains and monitors traffic sent on a current VTG by endpoints which are participating in the current VTG. The IPICS media service node may initially issue an IGMP that enables it to participate in and to monitor traffic sent within the current VTG.

In step 809, the IPICS media service node ascertains the legitimacy of traffic based on an applicable security policy. One suitable method of ascertaining the legitimacy of traffic will be described below with reference to FIGS. 9A and 9B. Once the legitimacy of traffic is ascertained, it is determined in step 813 whether a dynamic switchover is to be triggered. In one embodiment, the determination of whether a dynamic switchover is to be triggered includes determining whether a rogue or illegitimate endpoint has effectively been detected.

If the determination in step 813 is that a dynamic switchover is not to be triggered, it is determined in step 845 whether the monitored traffic indicates that the current VTG is to be torn down. Such a determination may include assessing whether traffic has not been detected for a predetermined amount of time and/or whether a dispatcher has issued a command to tear down the current VTG. If it is determined that that the current VTG is to be torn down, process flow returns to step 805 in which traffic sent within the current VTG continues to be obtained and monitored. Alternatively, if the traffic indicates that the current VTG is to be torn down, the current VTG is taken down in step 849, and the process of identifying a rogue endpoint is terminated.

Returning to step 813, if it is determined that a dynamic switchover is to be triggered, process flow moves to optional step 825 in which a new multicast address which may be used in the establishment of a new VTG may be provided to legitimate endpoints associated with the current VTG. In one embodiment, legitimate endpoints may have a list of alternative multicast addresses which may be used to establish new VTGs. A new multicast address may effectively be provided to legitimate endpoints using such a list. In an embodiment in which the legitimate endpoints have a list of alternative multicast addresses, a new multicast address does not need to be provided to legitimate endpoints, unless, for example, the list of alternative multicast addresses is somehow compromised. A list of alternative multicast addresses may be compromised if a rogue endpoint has access to the list, e.g., in the event that the rogue endpoint was previously considered to be a legitimate endpoint.

In step 829, the dynamic switchover of legitimate endpoints to a new multicast address is initiated. After the dynamic switchover is initiated, a new VTG is established in step 833 using the new multicast address provided in optional step 825, or using a new multicast address obtained from a list of alternative multicast addresses. Media streams are then exchanged within the new VTG in step 837. Then, in step 841, the new VTG is effectively set as the current VTG, i.e., the new VTG substantially becomes the current VTG. It should be appreciated that effectively setting the new VTG to be the current VTG may include tearing down the previous current VTG. After the new VTG is effectively set as the current VTG, process flow returns to step 805 in which traffic sent on the current VTG is obtained and monitored.

Figure 9A:
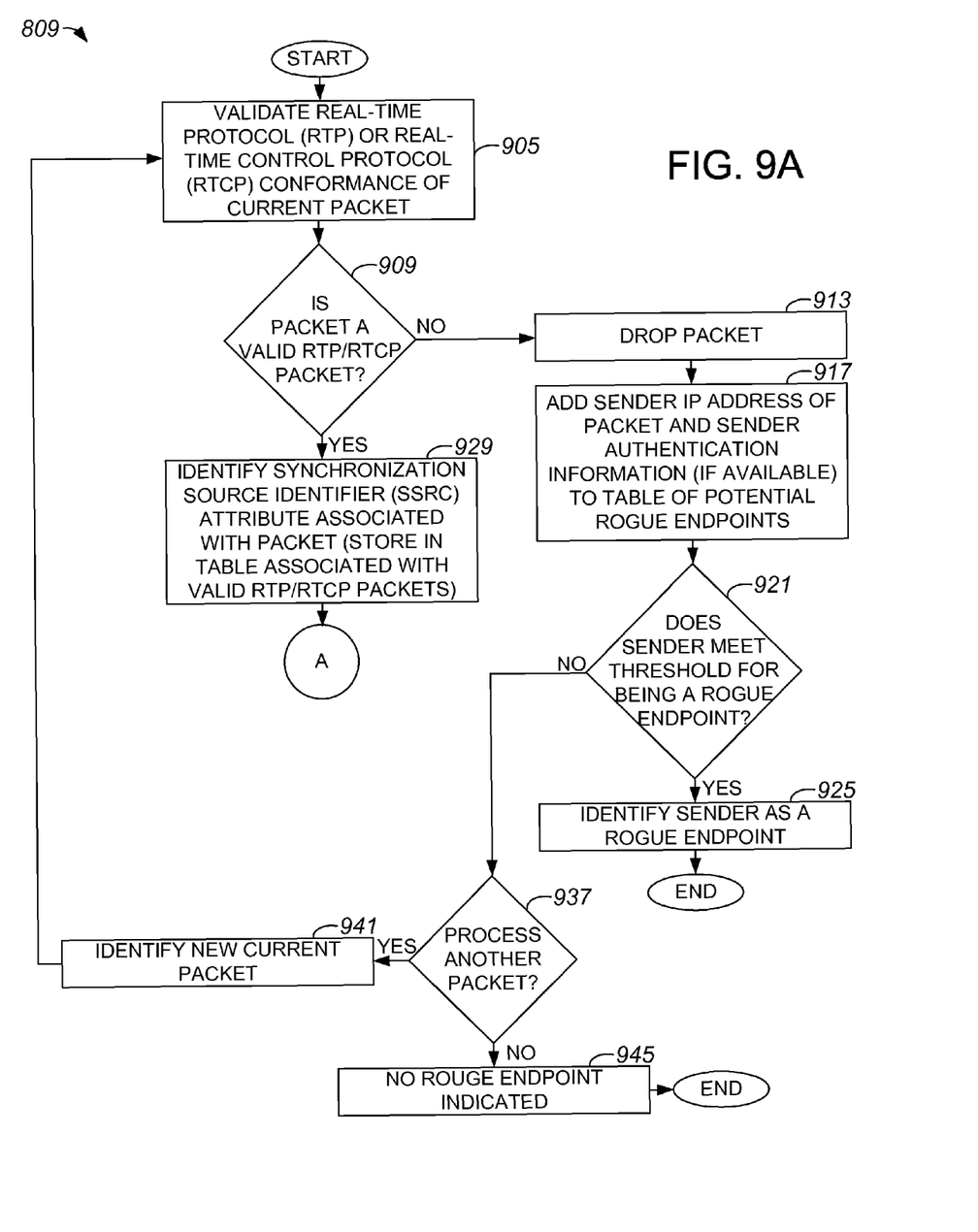
FIGS. 9A and 9B are a process flow diagram which illustrates one method of ascertaining the legitimacy of traffic based on a security policy, e.g., step 809 of FIG. 8, in accordance with an embodiment of the present invention.
Figure 9B:
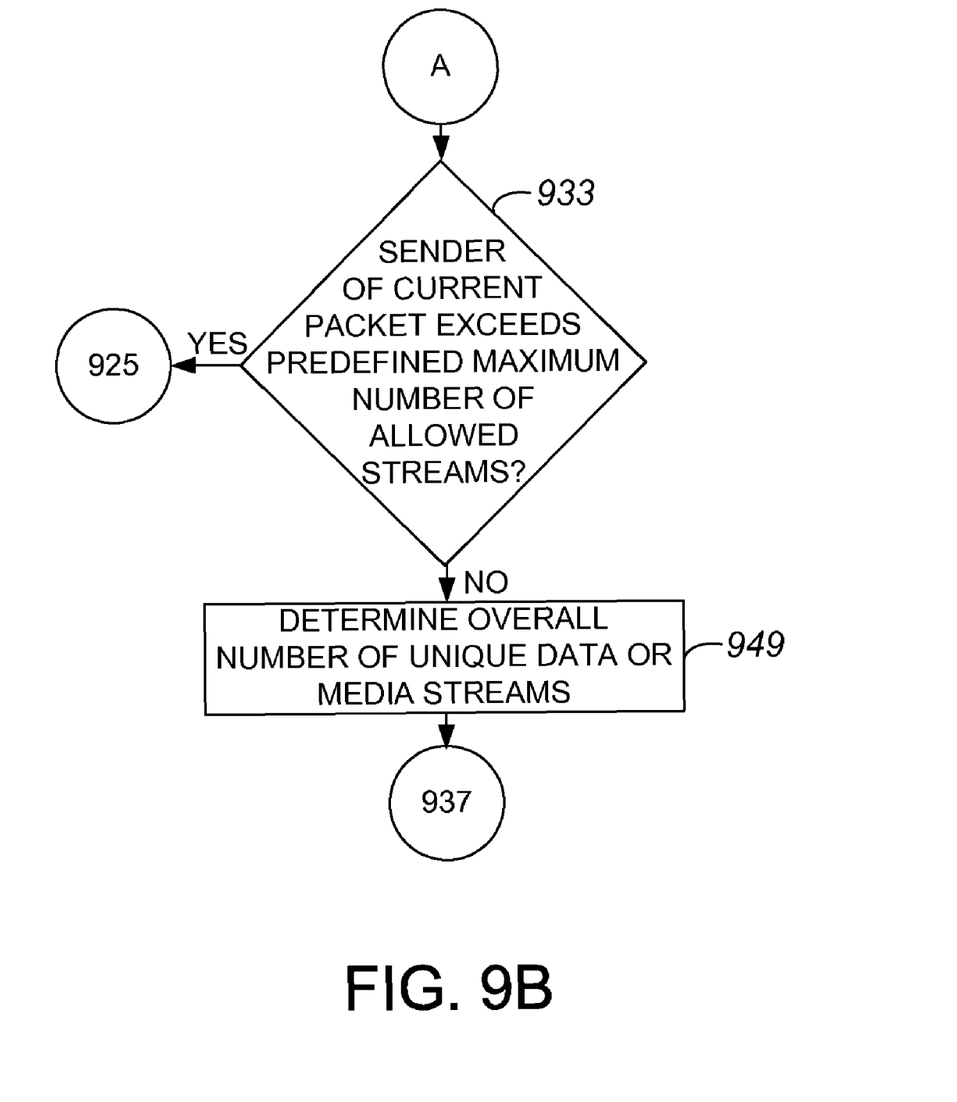

FIGS. 9A and 9B are a process flow diagram which illustrates one method of ascertaining the legitimacy of monitored traffic based on a security policy, e.g., step 809 of FIG. 8, in accordance with an embodiment of the present invention. The security policy may be established by a system administrator of an overall IPICS system. A method 809 of ascertaining the legitimacy of traffic begins at step 905 in which, for a packet that is a part of in the traffic, a validation of RTP or RTCP conformance with a priority policy is performed.

A determination is made in step 909 regarding whether the packet is a valid RTP or RTCP packet. If it is determined that the packet is not a valid RTP or RTCP packet, the packet is dropped in step 913. That is, if the packet does not conform to an RTP or RTCP priority policy, the packet is dropped. In accordance with one embodiment, a media stream may be considered to be in violation of a system policy, or invalid, if the media stream does not adhere to the priority policy of the system. For example, a media stream of a lower priority which does not yield the floor to a higher priority media stream may be considered to be invalid. After the packet is dropped, the sender IP address provided in the packet is added, along with any available sender authentication information, to a table which contains information regarding potential rogue endpoints. Typically, an entry is created for the sender IP address of the dropped packet.

Process flow moves from step 917 to step 921 in which it is determined if the sender meets a threshold for being identified as a rogue endpoint. The threshold may be provided by the security policy, and may indicate a number of non-policy conforming packets which may be received from a monitored endpoint before a particular endpoint, or the originator of non-policy conforming packets, is marked as rogue.

If it is determined that the sender meets the threshold for being identified as a rogue endpoint, the sender is identified as a rogue endpoint in step 925, and the process of ascertaining the legitimacy of traffic is completed. Alternatively, if it is determined that the sender does not meet the threshold for being identified as a rogue endpoint, process flow moves to step 937 in which it is determined if another packet is to be processed.

If the determination in step 937 is that another packet is to be processed, a new current packet id identified in step 941, and process flow returns to step 905 in which the RTP or RTCP conformance of the current packet with the priority policy is validated. On the other hand, if it is determined that another packet is not to be process, then no rogue endpoint is effectively indicated in step 945, and the process of ascertaining the legitimacy of traffic is completed.

Returning to step 909, if it is determined that the packet is a valid RTP or RTCP packet which conforms with the priority policy, then process flow moves to step 929 in which an SSRC attribute associated with the packet is identified. Once identified, the SSRC attribute associated with the packet may be stored in a table that contains information regarding valid RTP packets and valid RTCP packets associated with monitored traffic. Each SSRC typically corresponds to a unique media stream.

After the SSRC attribute associated with the packet is identified, it is determined in step 933 whether the sender of the current packet has exceeded its predefined maximum number of allowed streams. Such a determination may be made using information stored in the table that contains information regarding valid RTP packets and valid RTCP packets which conform to the appropriate priority policy. A security policy may define a maximum number of allowed streams per sender as any suitable number, e.g., approximately three. The predefined maximum number of allowed streams, however, is not limited to being approximately three.

If it is determined in step 933 that the sender of the current packet has exceeded its predefined maximum number of allowed streams, the implication is that the sender may be a rogue endpoint. As such, process flow proceeds to step 925 in which the sender of the packet is identified as being a rogue endpoint. Alternatively, if it is determined in step 933 that the sender of the current packets does not exceed the predefined maximum number of allowed streams, the overall number of unique data or media streams is determined in step 949. Such a determination may be made using SSRC attributes which are stored in the table associated with valid RTP packets and valid RTCP packets which conform to the priority policy. Once the number of overall unique data or media streams is determined, process flow returns to step 937 in which it is determined whether another packet is to be processed.

Although only a few embodiments of the present invention have been described, it should be understood that the present invention may be embodied in many other specific forms without departing from the spirit or the scope of the present invention. By way of example, while IPICS has been described as being a suitable interoperability system in which to implement the present invention, the present invention is not limited to being used within IPICS. In other words, functionality which enables a DOS attack to be defended against by identifying a source of the DOS attack, and creating a new VTG that does not include the source of the DOS attack, may be provided in substantially any interoperability system.

Similarly, the functionality to defend against DOS attacks by creating new VTGs is not limited to be provided to an IPICS media service node. Such functionality may be provided to substantially any component or components in IPICS. More generally, such functionality may be provided to substantially any component or components in a communications interoperability system.

A new VTG may be created that includes a subset of endpoints which send and exchange traffic in an old VTG for substantially any reason. That is, a new VTG that includes some of the endpoints associated with an old VTG is not limited to being created when a DOS attack is identified such that the source of the DOS attack is excluded from the new VTG. For example, if substantially any unwanted endpoint is determined to be participating in an old VTG, a new VTG may be created such that the unwanted endpoint is excluded. In one embodiment, an unwanted endpoint may be an endpoint which is suspected as being likely to become a rogue endpoint.

In lieu of creating a new VTG for legitimate or authenticated endpoints of an old VTG to join once it a DOS attack is detected on the old VTG, such legitimate endpoints may instead join an existing VTG. For instance, if it is not possible to create a new VTG for such legitimate endpoints to join, the legitimate endpoints may be allowed to join an existing VTG in order for the legitimate endpoints to continue communicating without departing from the spirit or the scope of the present invention.

In the event that more than one rogue endpoint is associated with a VTG, an IPICS media service node may identify substantially all rogue endpoints associated with the VTG before triggering a dynamic switchover. In other words, as more than one rogue endpoint may launch a DOS attack at any given time within a VTG, a dynamic switchover may be arranged to be triggered after it is determined that all rogue endpoints have been identified. Triggering a dynamic switchover after all rogue endpoints have been identified reduces the likelihood that a rogue endpoint may inadvertently be included in a dynamic switchover to a new VTG. If another rogue endpoint is identified after legitimate endpoints switch to a new VTG, it should be appreciated the process of triggering a dynamic switchover may repeat until substantially all rogue endpoints are eliminated from the "final" VTG.

The steps associated with the methods of the present invention may vary widely. Steps may be added, removed, altered, combined, and reordered without departing from the spirit of the scope of the present invention. For instance, in assessing the legitimacy of traffic, it may be determined whether an overall number of unique data or media streams exceeds a safety threshold provided in a security policy. The safety threshold may vary widely. In one embodiment, the safety threshold may be approximately 3 streams, although it should be appreciated that the safety threshold may be fewer than approximately 3 streams or greater than approximately 3 streams depending upon the requirements associated with an overall IPICS. Therefore, the present examples are to be considered as illustrative and not restrictive, and the invention is not to be limited to the details given herein, but may be modified within the scope of the appended claims.

What is claimed is:

1. A method comprising:
    establishing a first virtual talk group (VTG) that includes a plurality of endpoints, the plurality of endpoints including a first endpoint and a second endpoint, the first VTG having a first multicast address;
    monitoring traffic associated with the first VTG;
    determining when a denial of service (DOS) attack is indicated by the traffic;
    identifying at least one rogue endpoint responsible for the DOS attack when it is determined that the DOS attack is indicated by the traffic;
    notifying the first endpoint and the second endpoint to participate in a dynamic switchover from the first VTG to a second VTG when it is determined that the DOS attack is indicated by the traffic, the second VTG having a second multicast address; and
    establishing the second VTG to include the first endpoint and the second endpoint, but not to include the at least one rogue endpoint, wherein establishing the first VTG includes providing a list of alternative multicast addresses to the plurality of endpoints, the second multicast address being included in the list of alternative multicast addresses.

2. The method of claim 1 wherein notifying the first endpoint and the second endpoint includes notifying the plurality of endpoints.

3. The method of claim 1 further including:
    providing the second multicast address to the first endpoint and the second endpoint, but not to the at least one rogue endpoint, when it is determined that the DOS attack is indicated by the traffic.

4. The method of claim 1 wherein the plurality of endpoints includes the at least one rogue endpoint, and wherein the method further includes:
    identifying the at least one rogue endpoint as being included in the plurality of endpoints; and
    providing the second multicast address to the first endpoint and the second endpoint, but not to the at least one rogue endpoint, when it is determined that the DOS attack is indicated by the traffic.

5. The method of claim 1 wherein identifying the at least one rogue endpoint includes:
    determining that the traffic indicates that packets associated with the at least one rogue endpoint does not conform to a real-time protocol (RTP) or a real-time control protocol (RTCP) priority policy.

6. The method of claim 1 wherein identifying the at least one rogue endpoint includes:
    determining that the traffic indicates that the at least one rogue endpoint sends more than a predefined number of allowed data or media streams into the first VTG.

7. The method of claim 1 wherein establishing the second VTG includes preventing the rogue endpoint from listening to or transmitting into the second VTG.

8. The method of claim 1 wherein establishing the second VTG includes providing a one-way communication that enables the second VTG to communicate with the first VTG, and providing an ability for the rogue endpoint to listen to the second VTG but not to transmit into the second VTG.

9. Logic encoded in one or more non-transitory tangible media for execution and when executed operable to:
    establish a first virtual talk group (VTG) that includes a plurality of endpoints, the plurality of endpoints including a first endpoint and a second endpoint, the first VTG having a first multicast address;
    monitor traffic associated with the first VTG;
    determine when a denial of service (DOS) attack is indicated by the traffic;
    identify at least one rogue endpoint responsible for the DOS attack when it is determined that the DOS attack is indicated by the traffic;
    notify the first endpoint and the second endpoint to participate in a dynamic switchover from the first VTG to a second VTG when it is determined that the DOS attack is indicated by the traffic, the second VTG having a second multicast address; and
    establish the second VTG to include the first endpoint and the second endpoint, but not to include the at least one rogue endpoint, wherein the logic operable to establish the first VTG is operable to provide a list of alternative multicast addresses to the plurality of endpoints, the second multicast address being included in the list of alternative multicast addresses.

10. The logic of claim 9 wherein the logic operable to notify the first endpoint and the second endpoint is further operable to notify the plurality of endpoints.

11. The logic of claim 9 further operable to:
    provide the second multicast address to the first endpoint and the second endpoint, but not to the at least one rogue endpoint, when it is determined that the DOS attack is indicated by the traffic.

12. The logic of claim 9 wherein the plurality of endpoints includes the at least one rogue endpoint, and wherein the logic is further operable to:
    identify the at least one rogue endpoint as being included in the plurality of endpoints; and
    provide the second multicast address to the first endpoint and the second endpoint, but not to the at least one rogue endpoint, when it is determined that the DOS attack is indicated by the traffic.

13. The logic of claim 9 wherein the logic operable to identify the at least one rogue endpoint is operable to determine that the traffic indicates that packets associated with the at least one rogue endpoint does not conform to a real-time protocol (RTP) or a real-time control protocol (RTCP) priority policy.

14. The logic of claim 9 wherein the logic operable to identify the at least one rogue endpoint is operable to determine that the traffic indicates that the at least one rogue endpoint sends more than a predefined number of allowed data or media streams into the first VTG.

15. An apparatus comprising:
means for establishing a first virtual talk group (VTG) that includes a plurality of endpoints, the plurality of endpoints including a first endpoint and a second endpoint, the first VTG having a first multicast address;
means for monitoring traffic associated with the first VTG;
means for determining when a denial of service (DOS) attack is indicated by the traffic;
means for identifying at least one rogue endpoint responsible for the DOS attack when it is determined that the DOS attack is indicated by the traffic;
means for notifying the first endpoint and the second endpoint to participate in a dynamic switchover from the first VTG to a second VTG when it is determined that the DOS attack is indicated by the traffic, the second VTG having a second multicast address; and
means for establishing the second VTG to include the first endpoint and the second endpoint, but not to include the at least one rogue endpoint, wherein the means for establishing the first VTG include means for providing a list of alternative multicast addresses to the plurality of endpoints, the second multicast address being included in the list of alternative multicast addresses.

16. The apparatus of claim 15 wherein the means for notifying the first endpoint and the second endpoint include means for notifying the plurality of endpoints.

17. The apparatus of claim 15 further including:
means for providing the second multicast address to the first endpoint and the second endpoint, but not to the at least one rogue endpoint, when it is determined that the DOS attack is indicated by the traffic.

* * * * *